(12) United States Patent
Faessler

(10) Patent No.: US 6,597,896 B1
(45) Date of Patent: Jul. 22, 2003

(54) MOBILE TELEPHONE

(75) Inventor: Georg Faessler, Aabybro (DE)

(73) Assignee: Siemens AG (DE)

( * ) Notice: Subject to any disclaimer, the term of this patent is extended or adjusted under 35 U.S.C. 154(b) by 280 days.

(21) Appl. No.: 09/606,720

(22) Filed: Jun. 29, 2000

(30) Foreign Application Priority Data

Jun. 29, 1999 (EP) .............................................. 99112382

(51) Int. Cl.$^7$ ................................................. H04B 1/38
(52) U.S. Cl. ......................... 455/90; 455/550; 455/575; 343/702; 343/841; 379/433.01
(58) Field of Search ........................... 455/550, 90, 575; 343/702, 841; 379/433.01

(56) References Cited

U.S. PATENT DOCUMENTS

| | | | |
|---|---|---|---|
| 5,936,583 A | * 8/1999 | Sekine et al. | 343/702 |
| 5,999,831 A | * 12/1999 | Itoh | 455/575 |
| 6,075,977 A | * 6/2000 | Bayrami | 455/90 |
| 6,259,896 B1 | * 7/2001 | Sepponen | 455/90 |
| 6,314,277 B1 | * 11/2001 | Hsu et al. | 455/117 |

* cited by examiner

*Primary Examiner*—William Trost
*Assistant Examiner*—Thang Q. Le
(74) *Attorney, Agent, or Firm*—Kenyon & Kenyon

(57) ABSTRACT

A mobile phone includes an antenna on the backside. The backside of the mobile phone also includes a shield and, electrically connected to the shield, conductive barriers. The shield and the barriers reduce an amount of radiation sent from the antenna into the head of the user.

7 Claims, 2 Drawing Sheets

MOBILE TELEPHONE

BACKGROUND INFORMATION

It is known to arrange the antenna of a mobile telephone on the backside of the mobile telephone.

SUMMARY OF THE INVENTION

The mobile telephone according to the present invention has the advantage that the radiation transmitted into the head of a user is reduced.

The best place to arrange the antenna relative to the barriers is in the middle of the backside of the mobile phone. The barriers surround the antenna at least from two opposite sides, better from all four sides. The shield and the barriers can easily be fabricated from a single metal sheet, or by applying a conductive layer to a plastic backside of the mobile telephone. A further reduction of the radiation transmitted into the head of the user can be achieved by using barriers on the front side of the mobile side of the mobile telephone.

DETAILED DESCRIPTION

Figure 1:
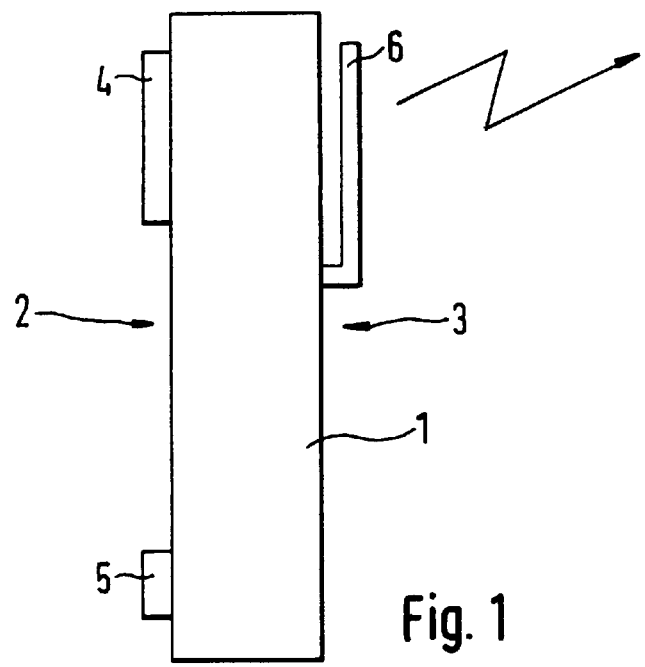
FIG. 1 shows a schematic view of a mobile telephone.

FIG. 1 shows a schematic view of a mobile telephone. The mobile telephone 1 includes a front side 2 and a back side 3. On the front side 2, a microphone 5 and a loud speaker 4 are arranged. On the back side 3, an antenna 6 for sending radio signals is located. When a user operates a mobile phone, he normally presses a loud speaker 4 against his ear, so that the microphone 5 is near or close to his mouth. The front side 2 is therefore oriented towards the head of the user. Since antenna 6 on the back side of the telephone emits radio signals, electromagnetic radiation is sent into the head of the user. The present invention concerns a mobile telephone, where this radiation into the head of the user is reduced. FIG. 1 is a schematic description of the mobile phone. It does not show the means for reducing the radiation emitted into the head of the user.

Figures 2, 3:
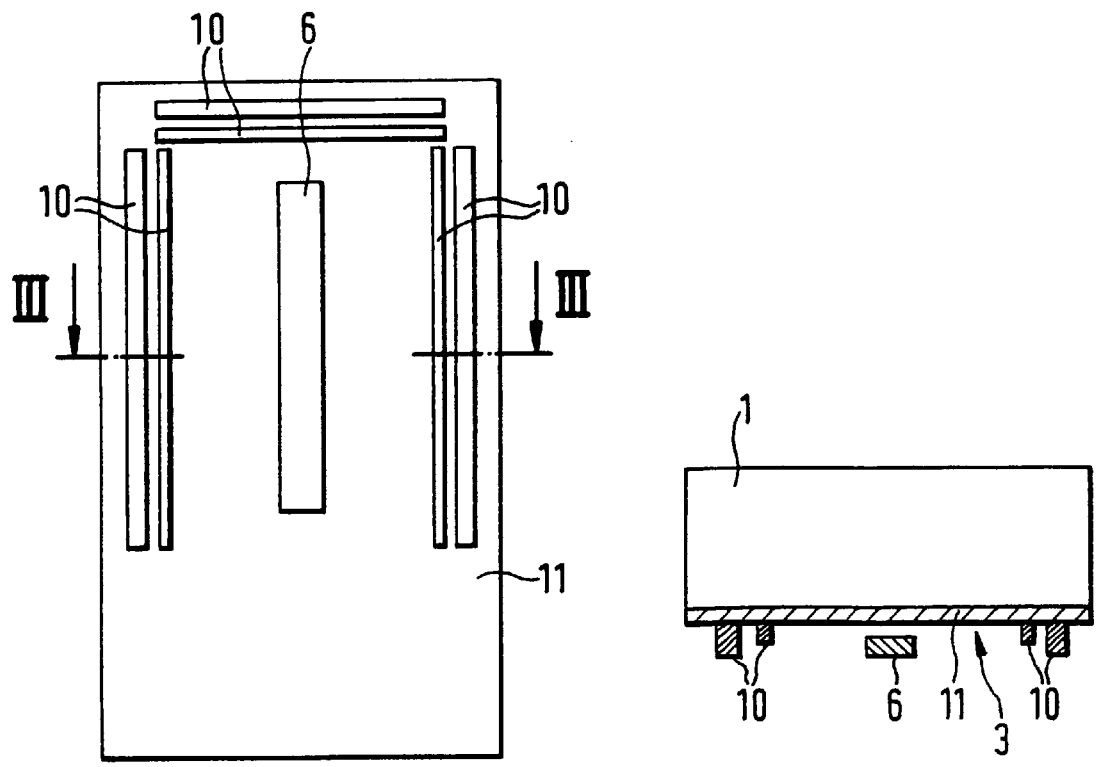
FIG. 2 shows the backside of a mobile phone according to the present invention.
FIG. 3 shows a cross-section of FIG. 2.

FIG. 2 shows the back side of a mobile telephone and FIG. 3 shows a cross-section of the mobile telephone of FIG. 2 along the line III—III. FIG. 2 shows the back side of a mobile telephone, with the antenna 6 being arranged approximately in the middle of the back side. As shown in FIG. 2, the antenna 6 is surrounded by barriers 10, that are arranged on a shield 11. As can be seen in FIG. 2, or in the cross-section of FIG. 3, the shield is covering the entire or part of the back side of the mobile telephone. The barriers 10 are long strip-like elements that extend above the shield 11. As can be seen in FIG. 3, the antenna is also elevated a little bit above the shield 11.

FIG. 2 and FIG. 3 show an antenna 6 that is surrounded on three sides with barriers 10, wherein the barriers 10 are two strip-like elements that are substantially parallel to each other, and are different in height. This is only one possible arrangement. It is also possible to have the antenna 6 surrounded from only two sides by barriers 10, or to have the antenna 6 surrounded from all four sides by barriers 10. Furthermore, it is possible that barriers 10 are not separate elements, so that only one barrier element is surrounding the antenna 6 on three or four side, in the form of a rectangular or oval or round ring surrounding the antenna 6. The barriers 10 must not necessarily be two parallel strips. The barriers can also have any other geometrical shape that extends over the substantially flat plate of the shield 11. These elements have to be electrically conducted, and they must have an electric contact to the shield 11. The barriers and the shield are connected to the ground potential.

The shield 11 can be formed together with the barriers 10 by stamping or embossing the single sheet of metal into the form of the shield 11 and the barrier 10. Since the back side of a mobile phone has very often not a totally even form, the shield 11 and the barriers 10 can also have a form that adjusts to a curvature of the backside of the mobile phone. It is important that the shield 11 is substantially flat and that the barriers 10 extend above the substantially flat shield 11.

For reducing the radiation radiated into the head of the user, it is useful to extend the barriers 10 as much as possible over the substantially flat surface of the shield 11. It is especially useful to extend the barriers 10 approximately as much as the antenna 6 extends over the shield 11.

A further possibility to fabricate the shield and the barriers 10 is to use a plastic backside for the mobile phone and cover this plastic by a conductive layer. This can be done by a conductive paint or by applying a thin metal film on a plastic backside of the mobile phone. The plastic backside of the mobile phone can be fabricated by injection molding of the plastic material and a following metallization step.

Figure 4:
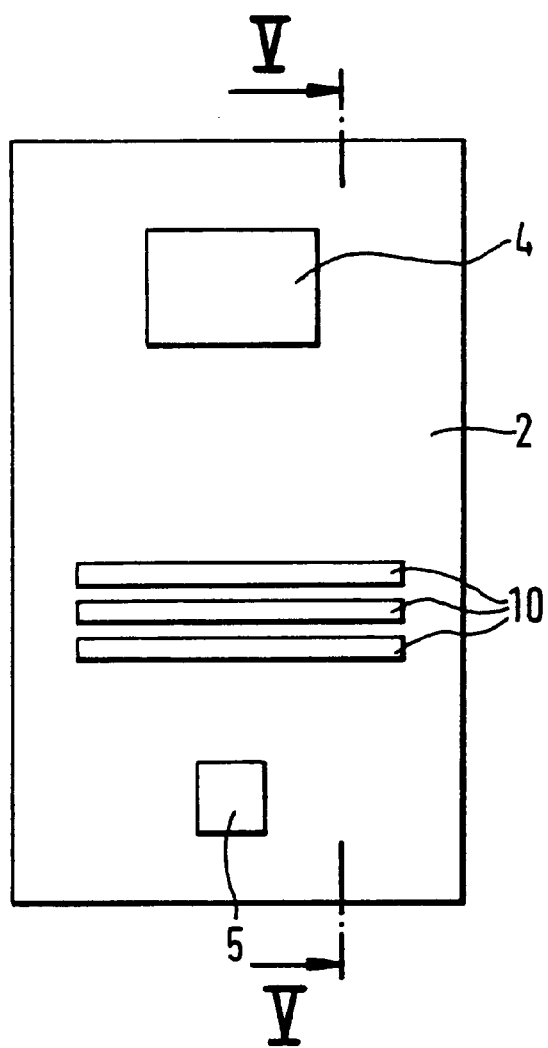
FIG. 4 shows the front side of a mobile telephone according to the present invention.
Figure 5:
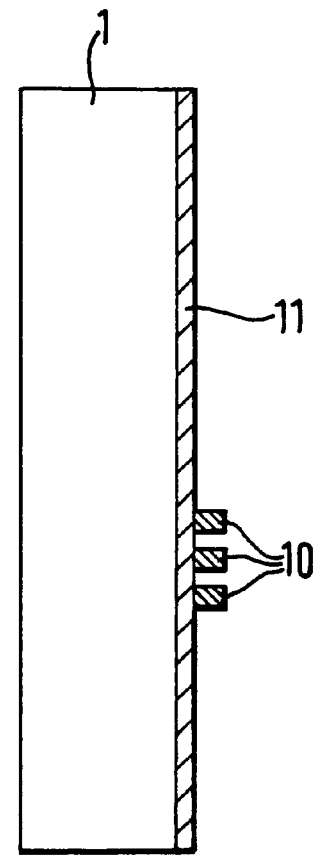
FIG. 5 shows a cross-section of FIG. 4.

FIG. 4 shows a view of a front side of a mobile phone including a front side barrier 10. FIG. 5 shows a cross-section along the line V—V of FIG. 4. FIG. 4 shows a front side of a mobile phone including a microphone 5 and a loud speaker 4. Arranged between the loud speaker 4 and the mobile phone 5 are three barriers 10. As can be seen in FIG. 5, the barriers 10 extend above a shield 11 that is on the front side 2. The front side barriers 10 are also used to reduce the amount of radiation radiated into the user's head. Since the loud speaker 4 is pressed against the ear of the user, this area of the mobile phone is very close to very sensitive parts of the head, like the brain or the eyes. It is therefore useful to reduce the radiation transmitted into the user's head further, especially for this area, since this type of biological material is assumed to react very sensitive to radiation.

FIGS. 4 and 5 show three barriers that are strip-like elements extending over the whole front side over the mobile phone. Again, all other conductive elements that are electrically connected to the shield 11 are useful for reducing the radiation sent from the mobile to the head of a user. It need not be three lines—it could be one or two, etc. The barriers and the shield are connected to the ground potential.

What is claimed is:

1. A mobile telephone comprising:

a front side oriented towards a head of a user when the telephone is used;

a back side;

an antenna situated on the back side;

a conductive shield covering a substantially whole portion of at least the back side, the shield including a substantially flat plate; and at least one conductive barrier extending a distance above the shield on the back side, wherein the at least one conductive barrier protrudes at least as far as the antenna protrudes from the shield on the back side and wherein the at least one conductive barrier is electrically connected to the shield.

2. The mobile telephone according to claim 1, wherein:

the antenna is situated in a middle part of the back side above the shield; and the at least one conductive barrier is a rim section of the shield.

3. The mobile telephone according to claim 2, wherein the at least one barrier surrounds the antenna from at least two sides.

4. The mobile telephone according to claim 2, wherein the at least one barrier surrounds the antenna from four sides.

5. The mobile telephone according to claim 1, wherein the at least one barrier and the shield are made from a single piece of sheet metal.

6. The mobile telephone according to claim 1, wherein the at least one barrier and the shield are made from a single piece of plastic coated with a conductive layer.

7. The mobile telephone according to claim 1, wherein the front side includes a front side barrier made from a conductive material and extending above the front side of the telephone.

* * * * *